United States Patent [19]
McCunn et al.

[11] Patent Number: 5,488,821
[45] Date of Patent: Feb. 6, 1996

[54] MULCHING MOWER MECHANISM

[75] Inventors: Myron L. McCunn, Orion; Ronald E. Rohren, Moline; Douglas P. Brown, Bettendorf; Richard L. Forest, Colona, all of Ill.

[73] Assignee: Deere & Company, Moline, Ill.

[21] Appl. No.: 337,338

[22] Filed: Nov. 9, 1994

[51] Int. Cl.$^6$ ............................ A01D 34/64; A01D 34/68; A01D 75/00
[52] U.S. Cl. ...................... 56/320.2; 56/320.1; 56/DIG. 9
[58] Field of Search ................ 56/320.2, 320.1, 56/17.5, 2, DIG. 9, 255

[56] References Cited

U.S. PATENT DOCUMENTS

| | | | |
|---|---|---|---|
| 3,134,212 | 5/1964 | Gary | 56/16.4 R |
| 3,905,181 | 9/1975 | Messner | 56/320.2 X |
| 4,189,903 | 2/1980 | Jackson et al. | 56/255 |
| 4,205,512 | 6/1980 | Thorud | 56/13.4 |
| 4,263,771 | 4/1981 | Iaboni et al. | 56/320.2 |
| 4,312,174 | 1/1982 | Vanderhoef | 56/320.2 |
| 4,318,268 | 3/1982 | Szymauls | 56/255 |
| 4,361,000 | 11/1982 | Friberg | 56/320.2 X |
| 4,890,446 | 1/1990 | Israel | 56/17.5 |
| 4,951,449 | 8/1990 | Thorud | 56/2 |
| 5,033,260 | 7/1991 | Jerry | 56/320.2 |
| 5,035,108 | 7/1991 | Meyer et al. | 56/320.2 X |
| 5,191,756 | 3/1993 | Kuhn | 56/17.5 |
| 5,267,429 | 12/1993 | Kettler et al. | 56/295 |

*Primary Examiner*—Stephen J. Novosad

[57] ABSTRACT

A mulching mower mechanism, having an inverted U-shaped channel member positioned within the outer periphery of a cutting chamber of a mower deck for generally confining the clippings circulating at the outer periphery of the cutting chamber. The channel member extends generally across the mower deck's discharge outlet for generally diverting the stream of clippings away from the outlet and thereby serves to maintain the clippings within the deck to be re-cut by the blade. The channel member includes an upper and outer wall portions positioned adjacent the discharge outlet for generally blocking the clippings and air within the channel from exiting the discharge outlet. The channel member also includes an inner wall portion which separates the stream of clippings from the relatively clean air circulating within the inner portion of the deck. The discharge outlet is in fluid communication with the inner portion of the cutting chamber for allowing the clean air to exit the cutting chamber via the discharge outlet, thereby maintaining an updraft within the cutting chamber.

42 Claims, 9 Drawing Sheets

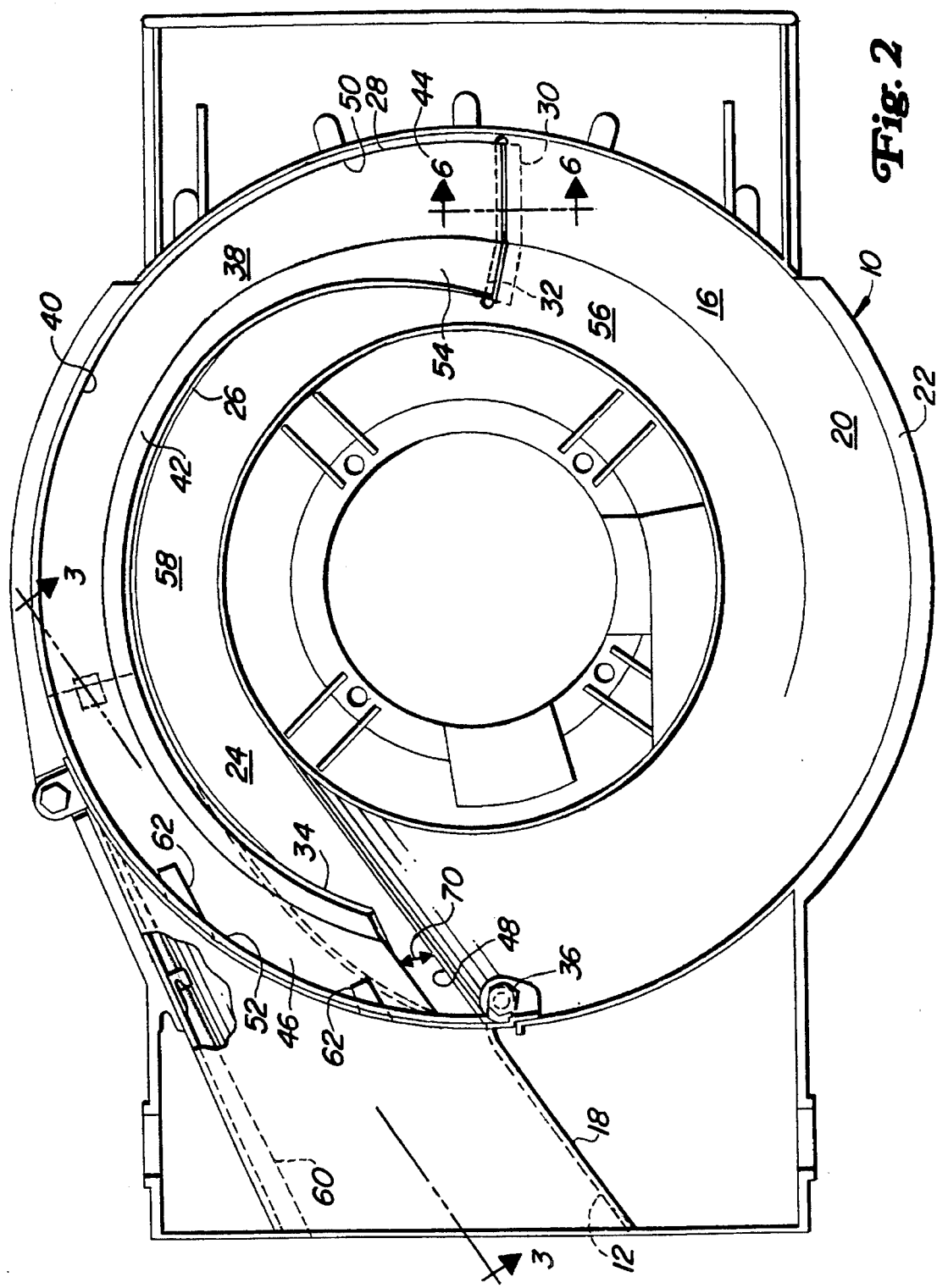

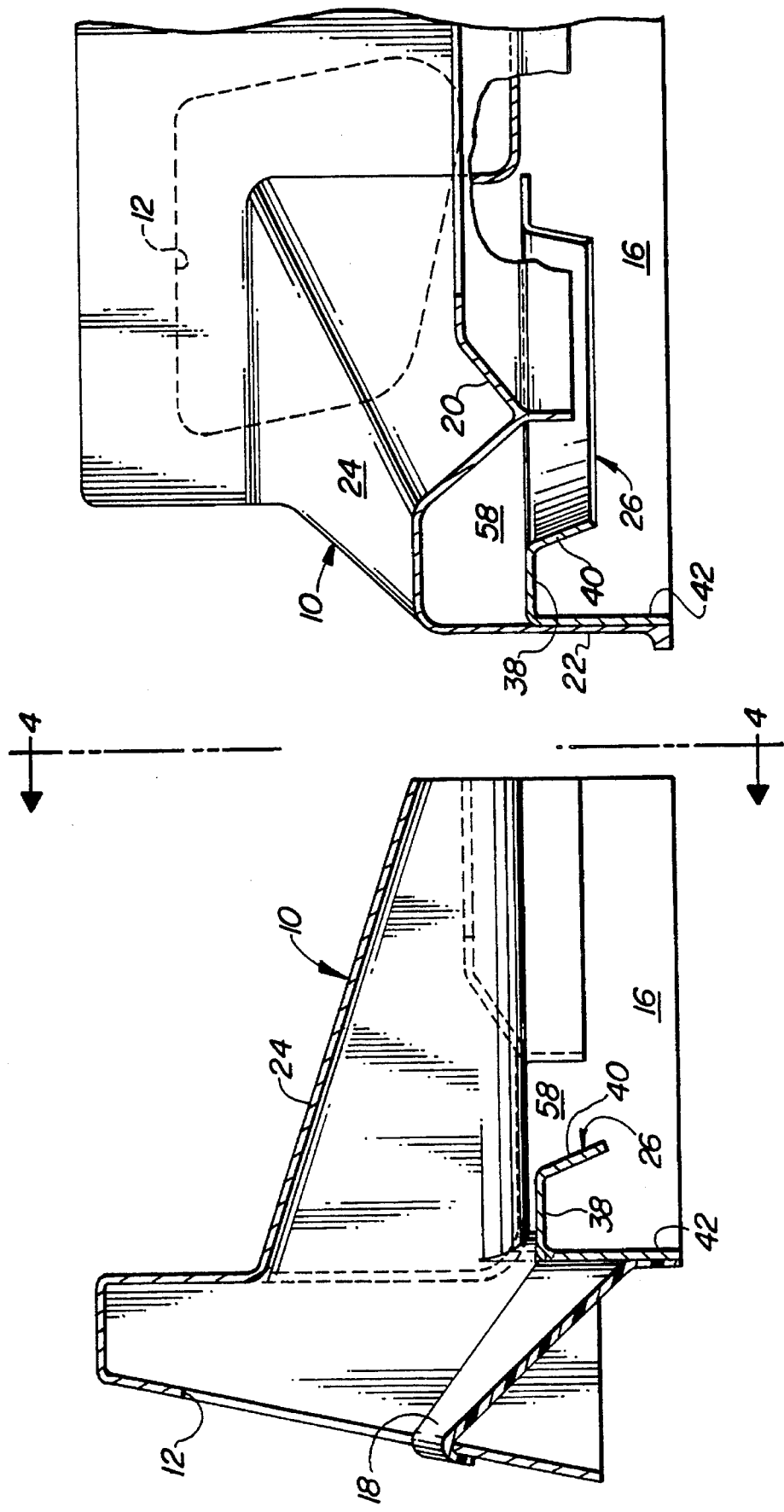

5,488,821

MULCHING MOWER MECHANISM

BACKGROUND OF THE INVENTION

Conventional mowers include a discharge outlet that allows grass clippings to exit the mower deck housing. A vacuum effect or updraft of air is created as air within the mower deck travels up and out the discharge outlet. The large vacuum effect created by these mowers lifts the grass for uniform cutting. Therefore, the cut quality achieved by these conventional mowers is relatively good. The clippings are either collected in a bag attached to the mower or are discharged across the ground. Disposing of bagged clippings is often viewed as inconvenient, and may be relatively costly. If the mower is adapted to discharge clippings through the discharge outlet and directly onto the ground, the need to dispose of bagged clippings is eliminated. This mode of operation has the disadvantage of leaving large clippings on top of the turf, which can be generally unsightly.

It is known to provide a mulching attachment which serves as a plug for blocking a mower's discharge outlet, and thereby causes recirculation of clippings within the mower deck such that they are re-cut many times and eventually become deposited on the ground. The need to bag the clippings is therefore eliminated. Furthermore, mulchers are designed to cut and re-cut clippings into very small particles which are then deposited into the turf. Mulchers are therefore intended to prevent large clippings from being left on top of the turf. However, when operating in tall wet grass these conventional mulching mower decks can become overloaded with grass clippings. When overloaded conventional mulching mechanisms tend to deposit clumps of large clippings on top of the turf. Furthermore, since conventional mulching mowers block the discharge outlet the vacuum effect or updraft of air is greatly decreased, which results in a reduction in cut quality.

Therefore, it would be desirable to provide a mulching mower which cuts and re-cuts grass clippings, deposits the small clippings into the turf, and which offer good cut quality. It would also be desirable to provide a mulching mower that does not leave unsightly clumps of large clippings on top of the turf when mowing in tall or wet grass which might otherwise cause overloading of the mower.

SUMMARY OF THE INVENTION

The preferred embodiment of the present invention provides a mulching mower mechanism having a channel member located at the outer periphery of the cutting chamber of a mower deck. The centrifugal force of the clippings during circulation within the housing tends to position the larger clippings near the outer periphery of the chamber. A stream of generally clean air circulates at the inner portion of the cutting chamber. The channel member includes an inner wall which extends downwardly from the top wall of the mower deck. The inner wall serves as a barrier to separate the stream of clippings circulating at the outer periphery of the cutting chamber from the stream of generally clean air circulating near the inner portion of the cutting chamber. A discharge outlet is provided which communicates with the inner portion of the cutting chamber to thereby allow the generally clean air flowing therein to exit the chamber. The channel member generally confines the stream of clippings and blocks the stream of clippings from flowing out the discharge outlet. The clippings therefore recirculate within the cutting chamber for being re-cut. Once the grass clippings become sufficiently small they eventually become deposited directly into the turf through the bottom of the mower deck.

When mowing in tall or wet grass the amount of clippings circulating within the cutting chamber increases. The centrifugal force of the large clippings tends to position these large clippings at the extreme outer periphery of the cutting chamber. Smaller clippings that have already been cut and re-cut are also directed out to the periphery of the cutting chamber, but because of their smaller mass they tend to accumulate radially inwardly of the stream of larger clippings. When an overload situation occurs, such as during mowing operations in wet or tall grass, the stream of clippings circulating in the channel gets larger until some of the smaller clippings spill over across the inner wall of the channel member and begin circulating in the inner portion of the cutting chamber. When this occurs, the smaller clippings circulating at the inner portion of the cutting chamber are allowed to flow out the discharge outlet. According to the present invention the smaller clippings particles tend to be discharged through the outlet and distributed across the turf during overload conditions. Therefore, the present invention generally prevents clumps of grass from being deposited on top of the turf when overload conditions are encountered.

BRIEF DESCRIPTION OF THE DRAWINGS

FIG. 2 is a bottom view of the mulching mechanism according to the present invention and with the channel member and discharge restrictor in place.

FIG. 3 is an elevational cross section taken along line 3—3 in FIG. 2, and without the discharge restrictor in place.

FIG. 4 is an elevational cross section taken along line 4—4 of FIG. 3.

DESCRIPTION OF THE PREFERRED EMBODIMENT

Figure 1:
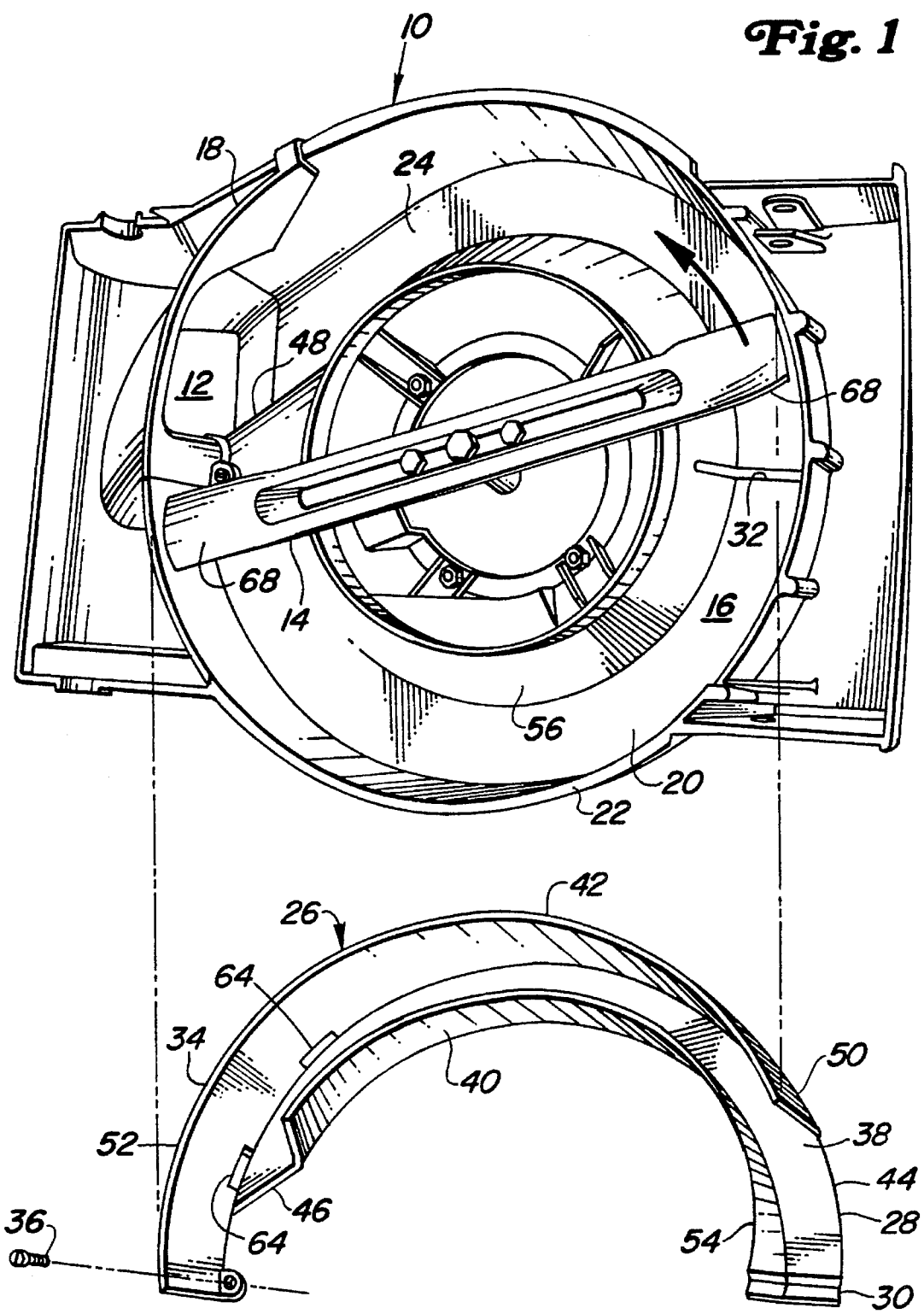
FIG. 1 is a perspective view of the underside of a mower deck with the channel member according to the present invention shown unattached for clarity.

Referring now to FIGS. 1 and 2, there are shown views of the underside of a mulching mower mechanism according to an embodiment of the present invention. The mower deck 10 shown in FIG. 1 is a conventional walk behind mower deck having a discharge outlet 12 at the rear of the deck 10 for allowing clippings cut by the blade 14 to be discharged from the cutting chamber 16. A plastic insert 18 is permanently attached to the metal deck 10 for defining the lower portion of the discharge outlet 12. The deck 10 includes a top wall 20 and a downwardly extending side wall 22. The top wall 20 includes an upwardly sloping portion 24 directly in front of the discharge outlet 12. This upwardly sloped portion 24 increases the volume of the cutting chamber 16 at the location directly in front of the discharge outlet 12 such that the clippings flowing toward the discharge outlet 12 do not become so densely compressed that they become clogged. A bagger attachment (not shown) can be coupled to the discharge outlet 12 for collecting clippings, or a chute (not shown) can be attached to the discharge outlet 12 for distributing the clippings to the side and onto the turf. The present invention can be attached to the conventional mower deck shown in FIG. 1 to convert the deck 10 to a mulching mode wherein clippings are generally prevented from exiting the discharge outlet 12 and are recirculated within the cutting chamber 16 for being re-cut by the blade 14 and deposited on the ground as mulch.

Figures 6, 7:
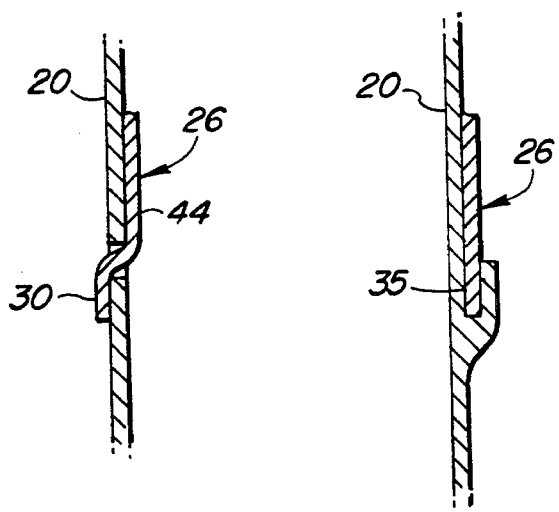
FIG. 6 is a cross sectional view taken along line 6—6 of FIG. 2.
FIG. 7 is an alternative embodiment of the coupling mechanism shown in FIG. 6.

A channel member 26 is provided by the present invention and can be coupled to the underside of the deck's top wall 20. The channel 26 extends around a portion of the cutting chamber's outer circumference and generally across the discharge outlet 12. The front portion 28 of the channel 26 is coupled to the top wall 20 of the deck 10 near where the top wall 20 begins to slope upwardly. An offset portion 30 of the channel 26 is positionable within a slot 32 formed in the top wall 20 and thereby holds the front portion 28 of the channel 26 in place during operation. FIG. 7 shows an alternative mechanism for attaching the front portion of the channel member 26 to the deck 10. A pocket member 35, as seen in FIG. 7 is adapted to receive the front portion of the channel member 26 and allows the channel member 26 to be easily coupled to the underside of the mower deck 10. The pocket member 35 can be formed integral with the deck 10 or can be fixed to the deck 10 by other methods such as welding. Other suitable attaching means, such as a nut and bolt arrangement, could also be utilized for securing the front portion 28 of the channel member 26 to the deck 10. The rear portion 34 of the channel member 26 is held securely by a screw 36 or other suitable securing means.

The channel member 26 includes an upper wall 38 and inner and outer walls 40 and 42 which extend downwardly from the top wall 20 of the deck 10. The front portion 44 of the upper wall 38 abuts the top wall of the deck, and extends rearwardly across the upwardly sloping portion 24 of the top wall 20 of the deck 10. The rear portion 46 of the upper wall 38 is positioned adjacent the central rear portion 48 of the deck 10. The upper wall 38 generally spans the length of the upwardly sloping portion 24 of the deck 10. The upper wall 38 acts to prevent clippings and air traveling at the outer periphery of cutting chamber 16 from rising up into the increased volume area of the cutting chamber 16 in front of the discharge outlet 12.

The front portion 50 of the outer wall 42 abuts against the side wall 22 of the deck 10. The rear portion 52 of the outer wall 42 extends across the discharge outlet 12 for generally preventing clippings and air traveling at the outer periphery of the cutting chamber 16 from escaping radially through the discharge outlet 12.

The front portion 54 of the inner wall 40 abuts against a slightly sloped inner portion 56 of the top wall 20 of the deck 10. The middle and rear portions of the inner wall 40 are generally sloped and are generally parallel to the deck's inner portion 56. The inner wall 40 serves to separate the clippings traveling at the periphery of the cutting chamber 16 from the relatively clean air traveling in the inner portion 58 of the cutting chamber 16.

Figure 5:
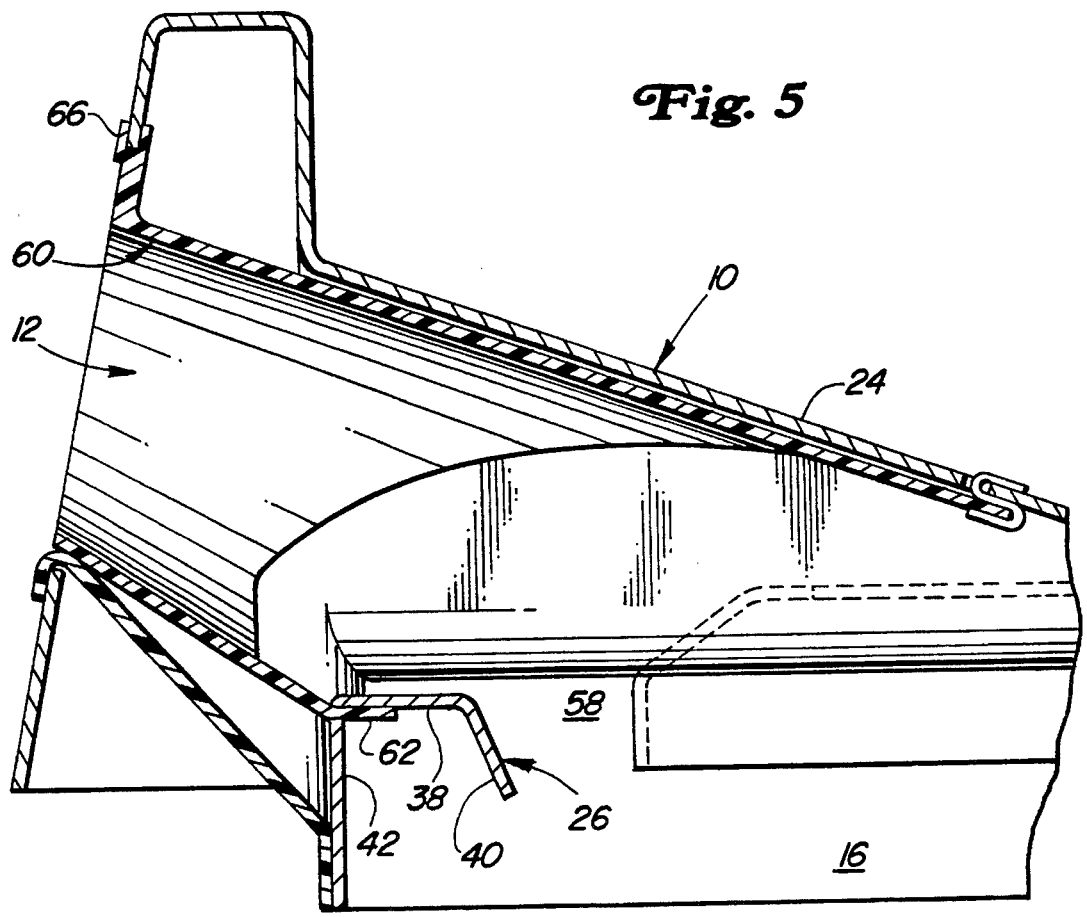
FIG. 5 is the cross sectional view shown in FIG. 3 with the discharge restrictor in place.
Figure 9:
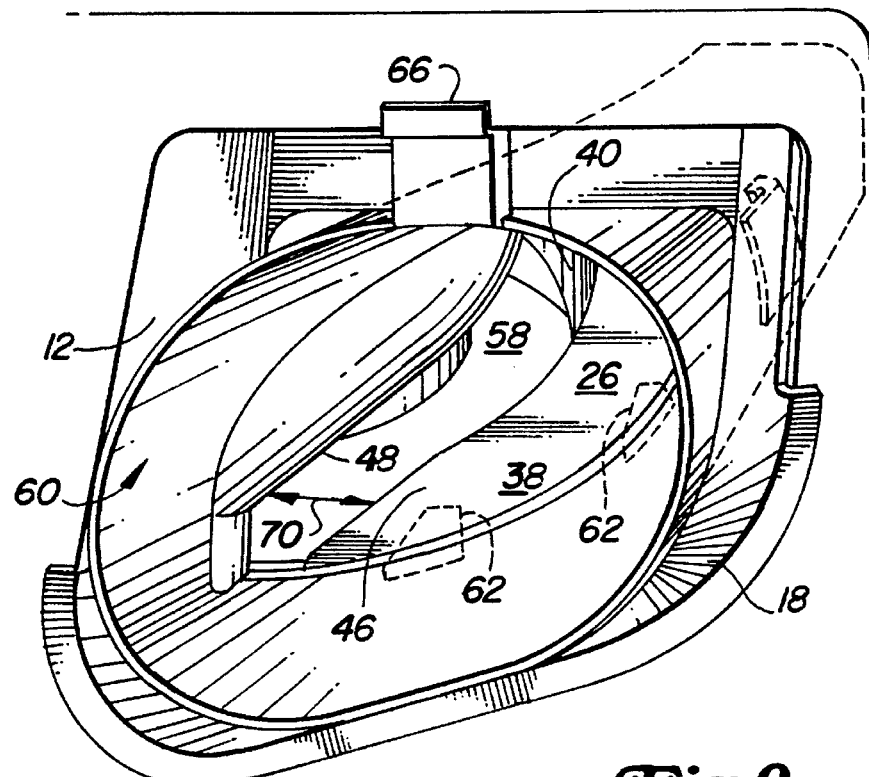
FIG. 9 is a view as seen in FIG. 8 with the discharge restrictor in place.

A restriction member 60 is provided, as seen in FIGS. 2, 5 and 9, which is insertable into the discharge outlet 12 from the rear of the mower deck 10. The restriction member 60 acts to generally reduce the volume of space within the discharge outlet 12 for increasing the speed of the air exiting the cutting chamber via the discharge outlet, thereby insuring that any clippings carried into the discharge outlet 12 by the exiting air are discharged through the outlet 12 without clogging. As best seen in FIGS. 2, 5 and 9, the restriction member 60 includes tabs 62 which are insertable into slots 64 defined in the channel member 26. A securing structure 66, as best seen in FIGS. 5 and 9, is provided at the top rear portion of the restriction member 60. Once the tabs 62 are inserted into the slots 64 in the channel member 26, the restriction member 60 can be flexed slightly to snap the securing member 66 onto a rear portion of the discharge opening 12 for holding the restriction member 60 securely in place.

Next, the operation of the present invention will be described. As the mower blade 14 rotates within the cutting chamber 16, grass and vegetation are cut near the front of the deck 10 and near the outer periphery of the cutting chamber. The clippings travel upwardly in the updraft created by the upturned wing 68 formed on the blade 14. The draft or air current created by the blade's wing portion 68 also moves grass particles toward the discharge outlet 12. As the clippings travel around the cutting chamber 16, the centrifugal force of the clippings causes the clippings to remain at the outer periphery of the cutting chamber 16. As the clippings circulate near the outer periphery of the chamber 16 the stream of clippings enters into and is generally confined by the channel member 26. The channel member 26, and particularly the inner wall 40, acts to separate the clippings circulating at the periphery from the generally clean air circulating near the center of the chamber 16. The channel member 26, particularly the upper and outer walls 38 and 42, also acts to generally block the stream of clippings from exiting the chamber 16 through the discharge outlet 12. The generally clean air circulating near the center of the chamber 16 is not blocked by the channel member 26 from flowing out the discharge outlet 12. Rather, the discharge outlet 12 is in fluid communication with the inner portion 58 of the chamber 16, allowing the generally clean air to travel out the discharge outlet 12. The present invention thereby acts to discharge only generally clean air from the cutting chamber 16. The clippings continue to circulate within the chamber 16 and are re-cut. As the clippings become smaller and smaller they eventually fall to the ground as mulch. The exit of air from the chamber 16 through the outlet 12 enhances the vacuum or updraft effect created by the wings 68 of the blade 14, and therefore grass is held upright for cutting. The present invention therefore provides a good cut quality while at the same time providing a mulching function.

The restriction member 60 serves to reduce the volume within the discharge outlet 12, thereby maintaining a relatively high air speed through the discharge outlet 12. Higher air speeds within the outlet 12 act to better carry any small clippings through the outlet 12. Excessive accumulation of material or clogging within the cutting chamber 16 or discharge outlet 12 is thereby hindered by the restriction member 60.

Figure 8:
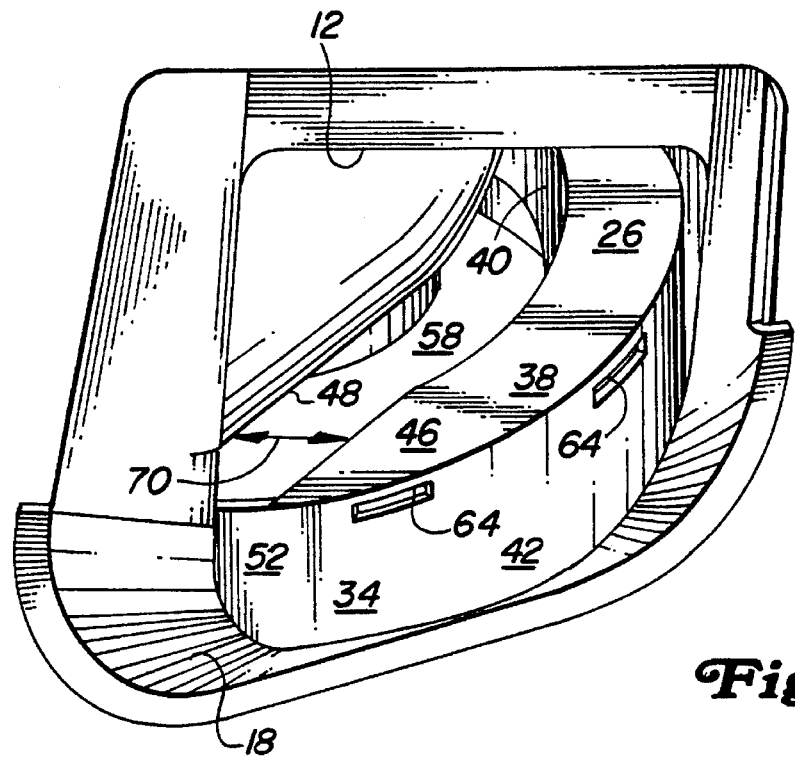
FIG. 8 is a perspective view from behind the mower deck and showing the discharge opening without the discharge restrictor in place.

As seen in FIGS. 2, 8 and 9, the rear portion 46 of the upper wall 38 of the channel 26 is spaced a short distance from and slightly below the generally horizontally extending top wall 20 of the deck 10 at the central rear portion of the deck. The spacing of the rear portion 34 of the channel 26 from the central rear portion 48 of the deck 10 provides a gap 70 through which material traveling in the inner portion 58 of the deck 10 can pass. If the gap 70 was not present then circulating clippings might become wedged between the top and inner walls 38 and 40 of the channel member 26 and the deck walls in this area. The gap 70 therefore allows clippings to pass therethrough such that excessive accumulation or clogging in that area is generally prevented. However, the gap 70 is relatively small such that clippings traveling within the channel 26 will tend to jump across the gap 70 for recirculation and re-cutting by the blade 14. The gap 70 is therefore not so large as to allow clippings flowing within the channel 26 to be directed through the gap 70 and upwardly out the discharge outlet 12.

When mowing in tall or wet grass the amount of clippings circulating within the cutting chamber 16 increases. The centrifugal force of the largest clippings within the deck 10 tends to position these large clippings at the extreme outer periphery of the cutting chamber 16. The smaller clippings which have already been cut and re-cut are also held at the periphery of the cutting chamber 16 by their centrifugal force, but because of their smaller mass they tend to accumulate radially inwardly of the stream of largest clippings. When an overload situation occurs, such as during mowing operations in wet or tall grass, more and more clippings circulate within the cutting chamber 16 until the stream of clippings gets so larger that some of the smaller clippings spill over across the inner wall 40 of the channel member 26 and begin circulating in the inner portion 58 of the cutting chamber 16. When this overload condition occurs, the smaller clippings circulating at the inner portion 58 of the cutting chamber 16 are allowed to flow out the discharge outlet 12. According to the present invention the smaller clippings tend to be discharged through the outlet 12 and distributed across the turf during overload conditions. Therefore, the present invention generally prevents clumps of grass from being deposited on top of the turf when overload conditions are encountered.

FIGS. 1–9 show a conventional mower deck 10 which, when operated in a conventional mode will discharge clippings through the discharge outlet 12 directly or immediately after being cut. The present invention as shown in FIGS. 1–9 is designed to be attached to the conventional mower deck 10 for converting the mower to a mulching mode. The mulching mechanism according to the preferred embodiment can also be detached from the mower deck 10 for converting the mower back to a conventional bagging mode.

Figure 10:
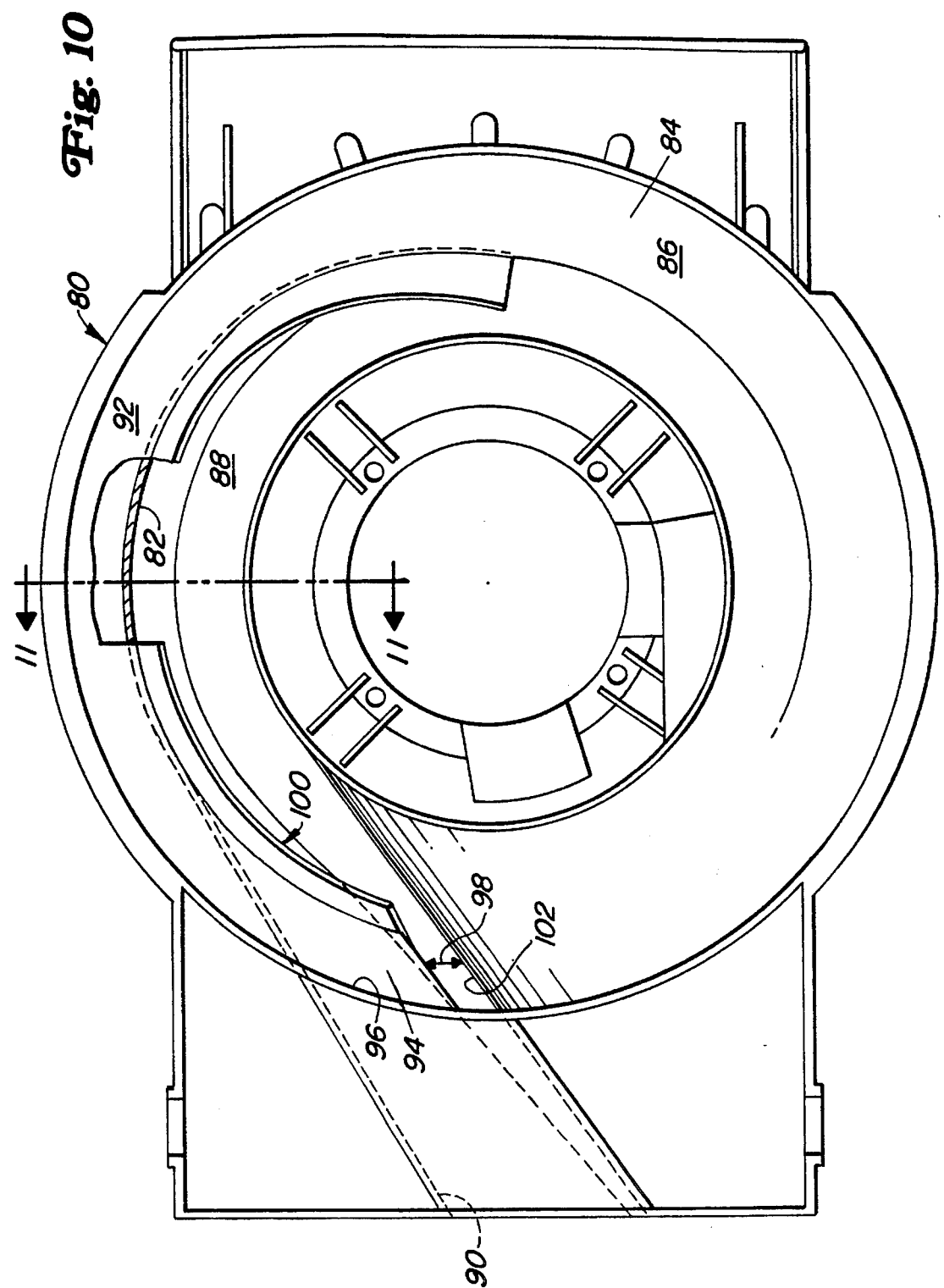
FIG. 10 is a bottom view of an alternative embodiment of the present invention having a channel member formed integral with the mower deck, and the mower deck having a generally restricted discharge outlet.
Figure 11:
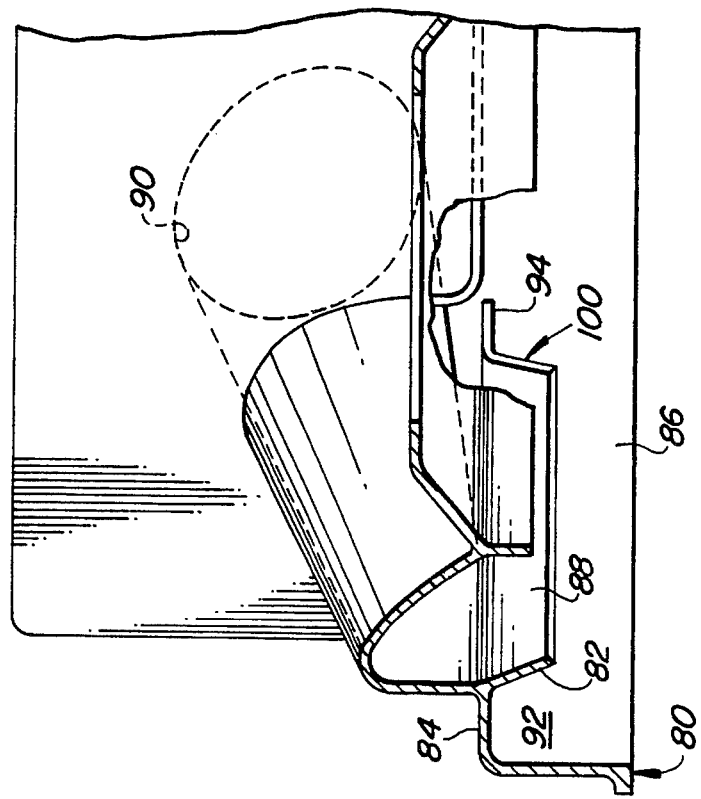
FIG. 11 is a cross sectional view taken along line 11—11 of FIG. 10. The mower deck in FIG. 11 is shown oriented right-side-up in its operating position for clarity.

Whereas FIGS. 1–9 illustrate a mulching mechanism which can be attached to and detached from a conventional mower deck 10, the channel member 26 of the present invention could also be adapted for use with a mower deck housing permanently dedicated to use with a channel member. Such an alternative embodiment is shown in FIGS. 10 and 11. The mower deck 80 includes an inner wall 82 which extends downwardly from a generally flat top wall 84 of a mower deck 80. The inner wall 82 separates the stream of clippings traveling at the outer periphery of the cutting chamber 86 from the relatively clean air circulating at the inner portion 88 of the cutting chamber 86.

The dedicated mulcher shown in FIGS. 10 and 11 includes a relatively small dedicated outlet 90 formed in the top wall 84 of the deck 80 and at a location directly above the inner portion 88 of the cutting chamber 86. The discharge outlet 90 is positioned directly above and in communication with the inner portion 88 of the cutting chamber 86 such that the generally clean air traveling in the inner portion 88 of the cutting chamber 86 can exit the cutting chamber 86 via the discharge outlet 90 for creating an updraft. Cut quality is thereby enhanced.

According to this alternative embodiment, the inner wall 82 separates the stream of clippings traveling at the outer portion 92 of the cutting chamber 86 from the relatively clean air traveling at the inner portion 88 of the cutting chamber 86. The inner wall 82 generally confines the stream of clippings and generally prevents them from flowing out the discharge outlet 90. This alternative embodiment also includes upper and outer wall sections 94 and 96 which extend generally across the discharge outlet 90 and generally confines the stream of clippings and prevents the large clippings from flowing out the discharge outlet 90. The portion of the channel 100 which extends across the discharge outlet may be formed integral with the mower deck, welded, bolted or otherwise permanently fixed in position within the cutting chamber.

As in the embodiment shown in FIGS. 1–9, a gap 98, as seen in FIG. 10 is defined between the channel member 100 and the central rear portion 102 of the deck 80. The gap 98 allows clippings materials to flow therethrough without becoming clogged, and the circulation of air and clippings is thereby facilitated. However, the gap 98 is small enough that the stream of large clippings circulating in the channel 100 will tend to be directed across the gap 98 without being drawn into the discharge outlet 90.

FIG. 11 is a sectional view of FIG. 10 taken along line 11—11 and clearly shows the inner wall 82 of the channel 100 formed integral with the deck 80. The top wall 84 of the deck 80 is generally flat, and defines the upper wall 94 of the channel member 100. As seen in FIG. 11, the discharge outlet 90 slopes upwardly from and is in fluid communication with the inner portion 88 of the cutting chamber 86 for allowing generally clean air to exit the chamber 86 through the discharge outlet 90. The discharge outlet 90 is relatively small for insuring that the air and any clippings moving therethrough will have sufficient speed to prevent clogging. Therefore no separate discharge outlet restrictor is required.

Figure 12:
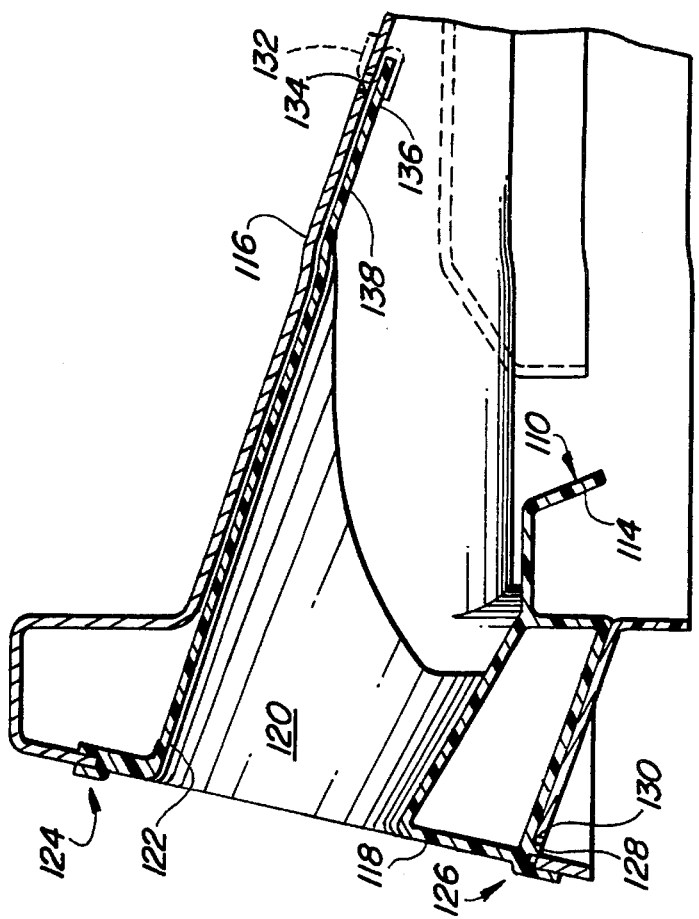
FIG. 12 is a cross sectional view of an assembled alternative embodiment.
Figure 13:
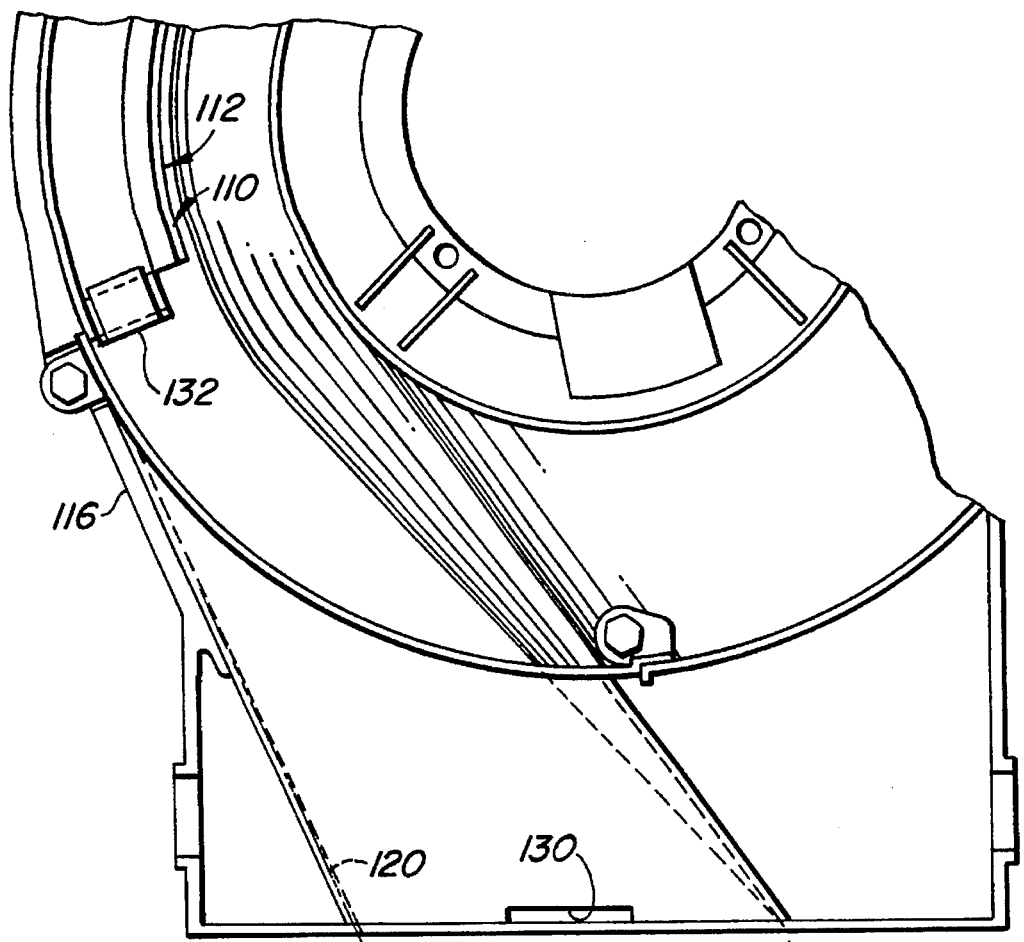
FIG. 13 is an exploded view from beneath the alternative embodiment shown in FIG. 12.
Figure 14:
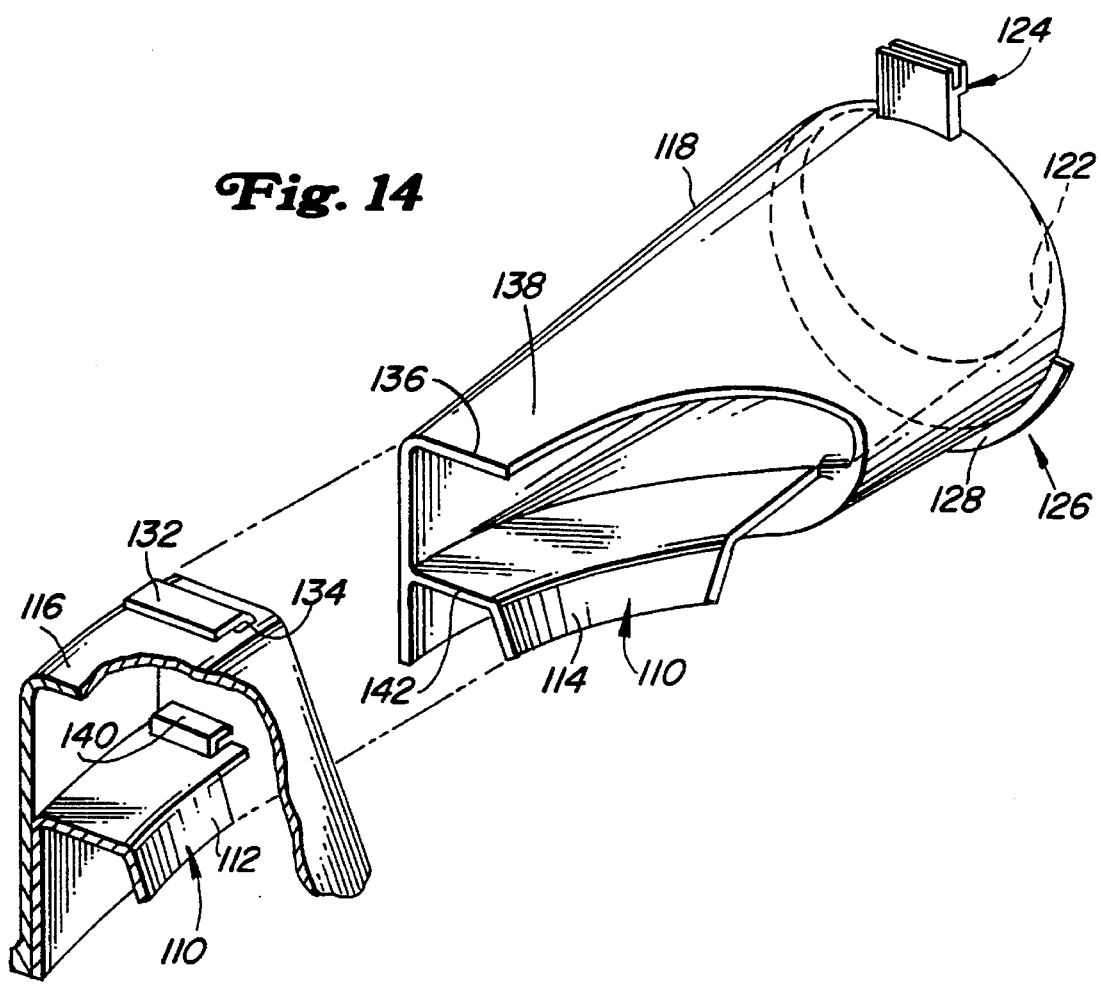
FIG. 14 is an exploded partial view of the embodiment shown in FIGS. 12 and 13.

FIGS. 12–14 illustrate another alternative embodiment of the present invention. FIGS. 12–14 show a mulching mechanism having a channel member 110 which functions during mowing operations in a manner similar to the channel members shown in FIGS. 1–11. However, the channel member 110 shown in FIGS. 12–14 is defined by separate front and rear portions 112 and 114. The front portion 112 of the channel member 110 is rigidly coupled with the mower deck 116, and the rear portion 114 of the channel 110 is coupled with an outlet restrictor 118 which can be inserted from the rear into the discharge outlet 112. The embodiment shown in FIGS. 12–14 allows the discharge restrictor 118 and rear portion 114 of the channel member 110 to be removed, thereby leaving only the front portion 112 of the channel member within the cutting chamber 16. With the restrictor 118 and rear portion 114 of the channel member 110 removed, the front portion 112 of the channel member 110 creates only a relatively small obstruction within the cutting chamber 16 and does not greatly affect the flow of clippings within the cutting chamber 16. The front portion 112 of the channel member 110 can remain in place within the cutting chamber 16 after the restrictor 118 is removed and allows conventional rear discharge mowing. The front portion 112 of the channel member 110 therefore remains in position within the cutting chamber 16 during both the mulching and rear discharge modes. Converting the mower back and forth between the mulching mode and the conventional rear discharge mode is therefore made relatively easy since the operator is merely required to remove or install a single part (the restrictor 118 and integral rear portion 114 of the channel 110) within the rear of the discharge outlet 120.

When the restrictor 118 is inserted into the rear of the discharge outlet 120 the channel member's front and rear portions 112 and 114 meet to form a single channel member 110. The channel member 110 generally acts to confine the clippings stream circulating at the periphery of the cutting chamber 16 and blocks this stream from exiting through the discharge outlet 120. The restrictor 118 defines a passage 122 which communicates with the inner portion 58 of the cutting chamber 16 for allowing generally clean air to pass through the passage 122 to exit the cutting chamber 16 via the discharge outlet 120. The channel member 110 and restrictor 118 according to this embodiment therefore functions during mowing operations in a manner similar to the structures shown in FIGS. 1–11.

The restrictor 118 and rear portion 114 of the channel member 110 are securely held in position during operation. The restrictor 118 is flexible and includes an upper coupling mechanism 124 which secures the restrictor 118 to the deck 116. Flexing the restrictor 118 allows the upper coupling mechanism 124 to engage the rear edges of the deck's discharge outlet 120 to thereby hold the rear portion of the restrictor 118 in place. The restrictor 118 includes a lower coupling mechanism 126 having a peg portion 128 which is insertable into an opening 130 defined in the deck 116 and which thereby helps secure the restrictor 118 within the discharge outlet 120. An S-clip 132, as seen in phantom in FIG. 12, is positioned within a slot 134 formed in the top wall of the mower deck 116 for receiving a top edge 136 of the restrictor 118 and thereby securely holds the front portion 138 of the restrictor 118. Other suitable attaching mechanisms can also be utilized to secure the front portion 138 of the restrictor 118 within the cutting chamber 16. As seen in FIG. 14, an offset portion 140 is defined at the top of the front channel member 112. The offset portion 140 receives the leading edge 142 of the rear channel portion 114 and securely holds the rear channel portion 114 in position against the front channel member 112 during operation.

I claim:

1. A mulching mower, comprising:
   a mower deck defining a cutting chamber within which a cutting blade rotates,
   a channel located at the outer periphery of the cutting chamber for generally confining therein clippings and air circulating within an upper and outer portion of the cutting chamber, at least a portion of the channel being positioned proximate a top wall of the cutting chamber for confining said clippings and air therein, and
   a discharge outlet formed in the mower deck in communication with an inner portion of the cutting chamber, said inner portion of the cutting chamber being located radially inwardly from the channel, said discharge outlet being positioned to receive relatively clean air from said inner portion of the cutting chamber for allowing said relatively clean air to exit the cutting chamber through the discharge outlet, said channel being positioned to generally block the clippings and air confined therein from exiting through the discharge outlet, and allowing the clippings confined within the channel to recirculate within the cutting chamber for being re-cut by the blade.

2. The invention of claim 1, wherein said channel further comprises an inner wall which extends in a vertical dimension and which separates the clippings in the outer portion of the cutting chamber from the relatively clean air in the inner portion of the cutting chamber.

3. The invention of claim 1, wherein said channel includes an upper wall portion and an outer wall portion positioned adjacent the discharge outlet for generally blocking clippings and air traveling within the channel from exiting said discharge outlet.

4. The invention of claim 1, wherein said channel extends generally across said discharge outlet for directing clippings confined within the channel past said discharge outlet.

5. The invention of claim 1, wherein a top wall of the deck defines a portion of an upper wall of the channel, and
   the channel further includes an inner wall which extends in the vertical dimension and is integral with said mower deck.

6. The invention of claim 1, wherein said channel is detachable from said mower deck for converting said mower to a mode wherein all clippings are ejected through the discharge outlet directly after being cut.

7. The invention of claim 6, and further comprising a detachable discharge outlet restrictor for effectively decreasing the size of the discharge outlet to thereby maintain a relatively high velocity of air traveling therethrough.

8. The invention of claim 1, wherein at least a portion of said channel is removable through the discharge outlet for converting the mower from a mulching mode to a discharge mode.

9. The invention of claim 1, and further comprising a detachable discharge outlet restrictor for effectively decreasing the size of the discharge outlet to thereby maintain a relatively high velocity of air traveling therethrough, and
   at least a portion of said channel is coupled with said restrictor for being removed and attached to the mower deck with said restrictor when converting said mower between a mulching mode and a discharge mode.

10. A mulching mechanism, comprising:
    a mower deck defining a cutting chamber within which a cutting blade rotates, said deck including a discharge outlet which allows clippings material and air to exit the cutting chamber,
    a channel member positioned within the outer periphery of the cutting chamber for generally confining clippings and air at the periphery of the cutting chamber, wherein said channel member includes an upper wall portion and an outer wall portion positioned adjacent the discharge outlet for generally blocking clippings material and air within the channel from exiting said discharge outlet, and said channel member also includes an inner wall portion for generally containing the clippings and air within the channel member and for separating said fast moving air and clippings from relatively clean air circulating within an inner portion of the deck located radially inwardly of the inner wall, said inner portion of the cutting chamber being in fluid communication with the discharge outlet for allowing relatively clean air circulating in the inner portion of the cutting chamber to exit through the discharge outlet.

11. The invention of claim 10, wherein said channel member is an inverted generally U-shaped member.

12. The invention of claim 10, wherein said inner and outer wall portions extend downwardly from a top wall of the deck, and said upper wall extends generally horizontally.

13. The invention of claim 10, and further including a restriction member positionable within said discharge outlet for generally restricting the discharge outlet and generally maintaining a relatively high velocity of air within said discharge outlet.

14. The invention of claim 10, wherein said channel member is removable from the deck for converting the deck to a mode wherein generally all clippings are discharged through the discharge outlet directly after being cut.

15. The invention of claim 12, wherein said channel member and restriction member are removable for converting the deck to a mode wherein generally all clippings are discharged through the discharge outlet.

16. The invention of claim 10, wherein at least a portion of said channel is removable through the discharge outlet for converting the mower from a mulching mode to a discharge mode.

17. The invention of claim 10, and further comprising a detachable discharge outlet restrictor for effectively decreasing the size of the discharge outlet to thereby maintain a relatively high velocity of air traveling therethrough, and at least a portion of said channel is coupled with said restrictor for being removed and attached to the mower deck with said restrictor when converting said mower between a mulching mode and a discharge mode.

18. The invention of claim 10, wherein said mower deck includes a top wall, and a portion of said top wall slopes generally upwardly toward the discharge outlet for directing clippings and air upwardly toward the discharge outlet.

19. The invention of claim 18, wherein a portion of said channel member generally spans said upwardly sloping portion of the top wall of the deck for generally blocking the clippings traveling through the channel member from exiting the cutting chamber through the discharge outlet.

20. The invention of claim 19, wherein an end portion of said channel member is spaced from a generally horizontal portion of the top wall of the deck.

21. The invention of claim 14, wherein the channel member includes an offset portion positionable within a slot formed in the mower deck for generally securing the channel member to the mower deck.

22. The invention of claim 15, wherein said restriction member is generally flexible and includes an attachment means which is held in securing abutment against the discharge outlet by the flexing of the restriction member.

23. The invention of claim 15, wherein tabs coupled with the restriction member are received within slots formed in the channel member to thereby generally secure the restriction member in position.

24. A mulching mechanism, comprising:

a mower deck defining a cutting chamber within which a cutting blade rotates, said deck including a discharge outlet which allows clippings material and air to exit the cutting chamber, a channel member having a generally inverted U-shape and positioned within the outer periphery of the cutting chamber for generally confining clippings and air at the periphery of the cutting chamber, wherein said channel member includes an upper wall portion and an outer wall portion positioned adjacent the discharge outlet for generally blocking clippings material and air within the channel from exiting said discharge outlet, and said channel member also includes an inner wall portion for generally containing the clippings and air within the channel member and for separating said clippings from relatively clean air circulating within an inner portion of the deck, said inner portion of the cutting chamber being in fluid communication with the discharge outlet for allowing relatively clean air traveling in the inner portion of the cutting chamber to exit through the discharge outlet, and wherein said channel member is removable from the deck for converting the deck to a non-mulching mode wherein said clippings are discharged through the discharge outlet directly after being cut.

25. The invention of claim 24, wherein said inner and outer wall portions extend downwardly from a top wall of the deck, and said upper wall extends generally horizontally.

26. The invention of claim 24, wherein at least a portion of said channel member is removable through the discharge outlet for converting the mower to a mode wherein generally all clippings are directed out through the discharge outlet.

27. The invention of claim 24, and further including a restriction member positionable within said discharge outlet for generally restricting the discharge outlet and generally maintaining a relatively high velocity of air within said discharge outlet.

28. The invention of claim 27, wherein said channel member and restriction member are removable for converting the deck to a non-mulching mower which discharges generally all clippings through the discharge outlet directly after being cut.

29. The invention of claim 27, wherein at least a portion of said channel is coupled with the restriction member for being removed and attached to the mower therewith.

30. The invention of claim 24, wherein said mower deck includes a top wall, and a portion of said top wall slopes generally upwardly toward the discharge outlet for directing clippings and air upwardly toward the discharge outlet.

31. The invention of claim 30, wherein a portion of said channel member generally spans said upwardly sloping portion of the top wall of the deck for generally blocking clippings traveling through the channel member from exiting the cutting chamber through the discharge outlet.

32. The invention of claim 31, wherein an end portion of said channel member is spaced from a generally horizontal portion of the top wall of the deck.

33. The invention of claim 24, wherein the channel member includes an offset portion positionable within a slot formed in the mower deck for generally securing the channel member to the mower deck.

34. The invention of claim 27, wherein said restriction member is generally flexible and includes an attachment means which is held in securing abutment against the discharge outlet by the flex in the restriction member.

35. The invention of claim 27, wherein tabs coupled with the restriction member are received within slots formed in the channel member to thereby generally secure the restriction member in position.

36. The invention of claim 24, wherein said channel extends generally across the discharge outlet for blocking the clippings in the channel from exiting through the discharge outlet.

37. A mulching mower, comprising:

a mower deck defining a cutting chamber within which a cutting blade rotates, a channel located at the outer periphery of the cutting chamber for generally confining therein clippings and air circulating within an outer portion of the cutting chamber, a discharge outlet formed in the mower deck in communication with an inner portion of the cutting chamber, said inner portion of the cutting chamber being located radially inwardly from the channel, said discharge outlet being positioned to receive relatively clean air from said inner portion of the cutting chamber for allowing said relatively clean air to exit the cutting chamber through the discharge outlet, said channel being positioned to generally block the clippings and air confined therein from exiting through the discharge outlet, thereby allowing the clippings confined within the channel to recirculate within the cutting chamber for being re-cut by the blade, and said channel includes an inner wall which extends in a vertical dimension and which separates the clippings in the outer portion of the cutting chamber from relatively clean air circulating within the inner portion of the cutting chamber.

38. A mulching mower, comprising:

a mower deck defining a cutting chamber within which a cutting blade rotates, a channel located at the outer periphery of the cutting chamber for generally confining therein clippings and air circulating within an outer portion of the cutting chamber, wherein a top wall of the deck defines a portion of an upper wall of the channel, a discharge outlet formed in the mower deck in communication with an inner portion of the cutting chamber, said inner portion of the cutting chamber being located radially inwardly from the channel, said discharge outlet being positioned to receive relatively clean air from said inner portion of the cutting chamber for allowing said relatively clean air to exit the cutting chamber through the discharge outlet, said channel being positioned to generally block the clippings and air confined therein from exiting through the discharge outlet, thereby allowing the clippings confined within the channel to recirculate within the cutting chamber for being re-cut by the blade, and the channel further includes an inner wall which extends in the vertical dimension and is integral with said mower deck.

39. A mulching mower, comprising:

a mower deck defining a cutting chamber within which a cutting blade rotates, a channel located at the outer periphery of the cutting chamber for generally confining therein clippings and air circulating within an outer portion of the cutting chamber, a discharge outlet formed in the mower deck in communication with an inner portion of the cutting chamber, said inner portion of the cutting chamber being located radially inwardly from the channel, said discharge outlet being positioned to receive relatively clean air from said inner portion of the cutting chamber for allowing said relatively clean air to exit the cutting chamber through the discharge outlet, said channel being positioned to generally block the clippings and air confined therein from exiting through the discharge outlet, thereby allowing the clippings confined within the channel to recirculate within the cutting chamber for being re-cut by the blade, said channel being detachable from said mower deck for converting said mower to a mode wherein all clippings are ejected through the discharge outlet directly after being cut, and a detachable discharge outlet restrictor for effectively decreasing the size of the discharge outlet to thereby maintain a relatively high velocity of air traveling therethrough.

40. A mulching mower, comprising:

a mower deck defining a cutting chamber within which a cutting blade rotates, a channel located at the outer periphery of the cutting chamber for generally confining therein clippings and air circulating within an outer portion of the cutting chamber, and a discharge outlet formed in the mower deck in communication with an inner portion of the cutting chamber, said inner portion of the cutting chamber being located radially inwardly from the channel, said discharge outlet being positioned to receive relatively clean air from said inner portion of the cutting chamber for allowing said relatively clean air to exit the cutting chamber through the discharge outlet, said channel being positioned to generally block the clippings and air confined therein from exiting through the discharge outlet, thereby allowing the clippings confined within the channel to recirculate within the cutting chamber for being re-cut by the blade, and a detachable discharge outlet restrictor for effectively decreasing the size of the discharge outlet to thereby maintain a relatively high velocity of air traveling therethrough, and at least a portion of said channel is coupled with said restrictor for being removed and attached to the mower deck with said restrictor when converting said mower between a mulching mode and a discharge mode.

41. The invention of claim 10, wherein a portion of the channel is positioned proximate a top wall of the cutting chamber for receiving and confining said clippings and air.

42. The invention of claim 24, wherein a portion of the channel is positioned proximate a top wall of the cutting chamber for receiving and confining said clippings and air.

* * * * *